US012793722B2

(12) United States Patent
Kinuthia et al.

(10) Patent No.: US 12,793,722 B2
(45) Date of Patent: Nov. 10, 2026

(54) SPECTRUM CLASSIFIER FOR AUDIO CODING MODE SELECTION

(71) Applicant: Telefonaktiebolaget LM Ericsson (publ), Stockholm (SE)

(72) Inventors: Charles Kinuthia, Stockholm (SE); Erik Norvell, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 18/570,712

(22) PCT Filed: Jun. 29, 2021

(86) PCT No.: PCT/EP2021/067815
§ 371 (c)(1),
(2) Date: Dec. 15, 2023

(87) PCT Pub. No.: WO2023/274507
PCT Pub. Date: Jan. 5, 2023

(65) Prior Publication Data
US 2024/0296853 A1 Sep. 5, 2024

(51) Int. Cl.
*G10L 19/02* (2013.01)

(52) U.S. Cl.
CPC ................................ *G10L 19/0204* (2013.01)

(58) Field of Classification Search
CPC .................................................. G10L 19/0204
See application file for complete search history.

(56) References Cited

U.S. PATENT DOCUMENTS

| | | | | |
|---|---|---|---|---|
| 6,148,282 A * | 11/2000 | Paksoy | .................. G10L 19/18 704/214 |
| 2010/0063806 A1 | 3/2010 | Gao | |
| 2011/0075851 A1* | 3/2011 | LeBoeuf | ................ G10L 25/51 381/56 |
| 2013/0290003 A1* | 10/2013 | Choo | ..................... G10L 19/02 704/500 |
| 2013/0330082 A1* | 12/2013 | Perez | ..................... H04J 14/08 398/98 |
| 2016/0372126 A1 | 12/2016 | Atti et al. | |

(Continued)

OTHER PUBLICATIONS

International Search Report and Written Opinion of the International Searching Authority, PCT/EP2021/067815, mailed 17 pages.

(Continued)

*Primary Examiner* — Bryan S Blankenagel
(74) *Attorney, Agent, or Firm* — Sage Patent Group

(57) ABSTRACT

A method in an encoder to determine which of two encoding modes or groups of encoding modes to use is provided. The method includes deriving a frequency spectrum of an input audio signal. The method includes obtaining a magnitude of a critical frequency region of the frequency spectrum. The method includes obtaining a peakyness measure of the frame. The method includes obtaining a noise band detection measure. The method includes determining which one of the two encoding modes or groups of encoding modes to use based on at least the peakyness measure and the noise band detection measure. The method includes encoding the input audio signal based on the encoding mode determined to use.

25 Claims, 10 Drawing Sheets

(56) References Cited

U.S. PATENT DOCUMENTS

| | | | | |
|---|---|---|---|---|
| 2017/0125031 | A1 | 5/2017 | Liu et al. | |
| 2022/0284908 | A1* | 9/2022 | Guo | G10L 19/0204 |

OTHER PUBLICATIONS

ETSI TS 126 445 V14.1.0 (Aug. 2017); Technical Specification; Universal Mobile Telecommunications System (UMTS); LTE; Codec for Enhanced Voice Services (EVS); Detailed algorithmic description (3GPP TS 26.445 version 14.1.0 Release 14), 660 pages.

* cited by examiner

SPECTRUM CLASSIFIER FOR AUDIO CODING MODE SELECTION

CROSS REFERENCE TO RELATED APPLICATIONS

This application is a 35 U.S.C. § 371 national stage application of PCT International Application No. PCT/EP2021/067815 filed on Jun. 29, 2021, the disclosure and content of which is incorporated by reference herein in its entirety.

TECHNICAL FIELD

The present disclosure relates generally to communications, and more particularly to communication methods and related devices and nodes supporting wireless communications.

BACKGROUND

Modern audio codecs consist of multiple compression schemes optimized for signals with different properties. Typically, speech-like signals are processed with a codec operating in time-domain, while music signals are processed with a codec operating in transform-domain. Coding schemes that aim to handle both speech and music signals require a mechanism to recognize the input signal (a speech/music classifier) and switch between the appropriate codec modes. An overview illustration of a multimode audio codec using mode decision logic based on the input signal is shown in FIG. 1.

In a similar manner among the class of music signals one can discriminate more noise like music signals and harmonic music signals and build a classifier and an optimal coding scheme for each of these groups. In particular, the identification of signals that have a sparse and peaky structure is of high interest since transform-domain codecs are suitable for handling these types of signals. There are several known signal measures that aims to identify peaky signals structures, such as the crest C, which is determined in accordance with $$C = \frac{\max(|X(k)|)}{\sqrt{\frac{1}{L}\sum_{k=0}^{L-1}|X(k)|^2}}$$

or the spectral flatness f $$f = \frac{\left(\prod_{k=0}^{L-1}|X(k)|\right)^{\frac{1}{N}}}{\frac{1}{L}\sum_{k=0}^{L-1}|X(k)|}$$

A high spectral flatness or crest may indicate an encoding mode that is suitable for such spectra may be selected.

SUMMARY

There currently exist certain challenge(s). A variety of speech-music classifiers are used in the field of audio coding. However, these speech-music classifiers may not be able to discriminate between different classes in the space of music signals. Many speech-music classifiers do not provide enough resolution to discriminate between classes which are needed in a complex multimode codec.

The problem of harmonic and noise-like music segments discrimination is solved by a novel metric, calculated directly on the frequency-domain coefficients. The metric is based on a peakyness measure of the spectrum and a measure of the local concentration of energy which indicates a noisy component of the spectrum.

Various embodiments of inventive concepts that address these challenges involve analysis in the frequency domain in a critical band of the spectrum. The analysis comprises at least a peakyness measure, and the various embodiments provide an additional measure that gives an indication of a noisy band in the spectrum. Based on these measures, a decision is formed whether to use at least one encoding mode which is targeted for signals with strong peakyness while avoiding signals with a noisy band.

According to some embodiments of inventive concepts, a method in an encoder to determine which of two encoding modes or groups of encoding modes to use is provided. The method includes deriving a frequency spectrum of an input audio signal. The method further includes obtaining a magnitude of a critical frequency range of the frequency spectrum. The method further includes obtaining a peakyness measure. The method further includes obtaining a noise band detection measure. The method further includes determining which one of two encoding modes or groups of encoding modes to use based on at least the peakyness measure and the noise band detection measure. The method further includes encoding the input audio signal based on the encoding mode determined to use.

Analogous encoders, computer programs, and computer program products are provided.

According to other embodiments of inventive concepts, a method in an encoder to determine whether an input audio signal has high peakyness and low energy concentration is provided. The method includes deriving a frequency spectrum of an input audio signal. The method further includes obtaining a magnitude of a critical frequency range of the frequency spectrum. The method further includes obtaining a peakyness measure. The method further includes obtaining a noise band detection measure. The method further includes determining a harmonic condition based on at least the peakyness measure and the noise band detection measure. The method includes outputting an indication of whether the harmonic condition is true or false.

Analogous encoders, computer programs, and computer program products are provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 7:
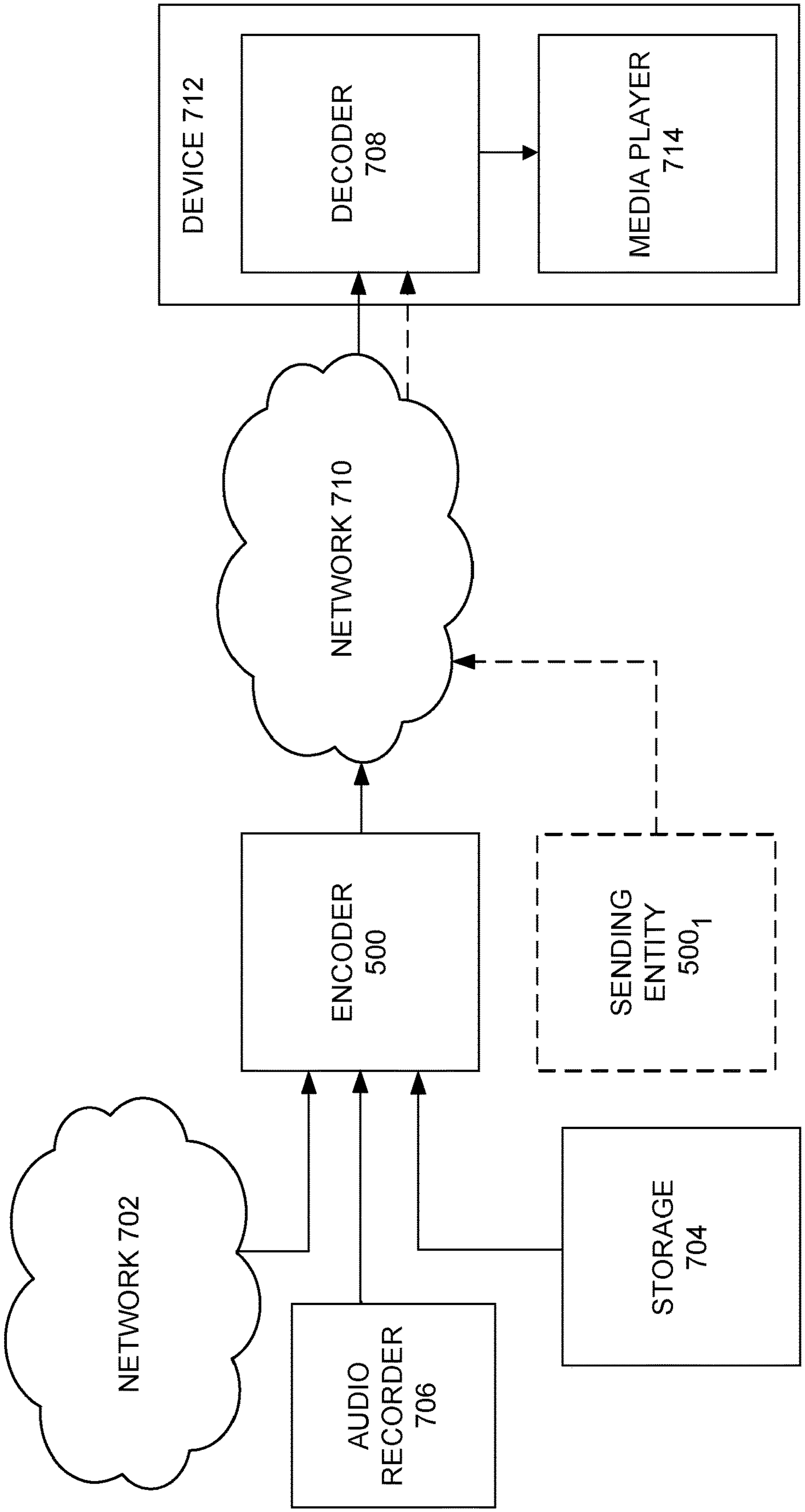
FIG. 7 is a block diagram illustrating an example of an operating environment according to some embodiments of inventive concepts.

Prior to describing the embodiments in further detail, FIG. 7 illustrates an example of an operating environment of an encoder 500 that may be used to encode bitstreams as described herein. The encoder 500 receives audio from network 702 and/or from storage 704 and/or from an audio recorder 706 and encodes the audio into bitstreams as described below and transmits the encoded audio to decoder 708 via network 710. In some embodiments where the encoder 500 is a distributed encoder, a sending entity 5001 may transmit the encoded audio to decoder 708 via network 710 as indicated by the dashed lines. Storage device 704 may be part of a storage depository of multi-channel audio signals such as a storage repository of a store or a streaming audio service, a separate storage component, a component of a mobile device, etc. The decoder 708 may be part of a device 712 having a media player 714. The device 712 may be a mobile device, a set-top device, a desktop computer, and the like.

Figure 8:
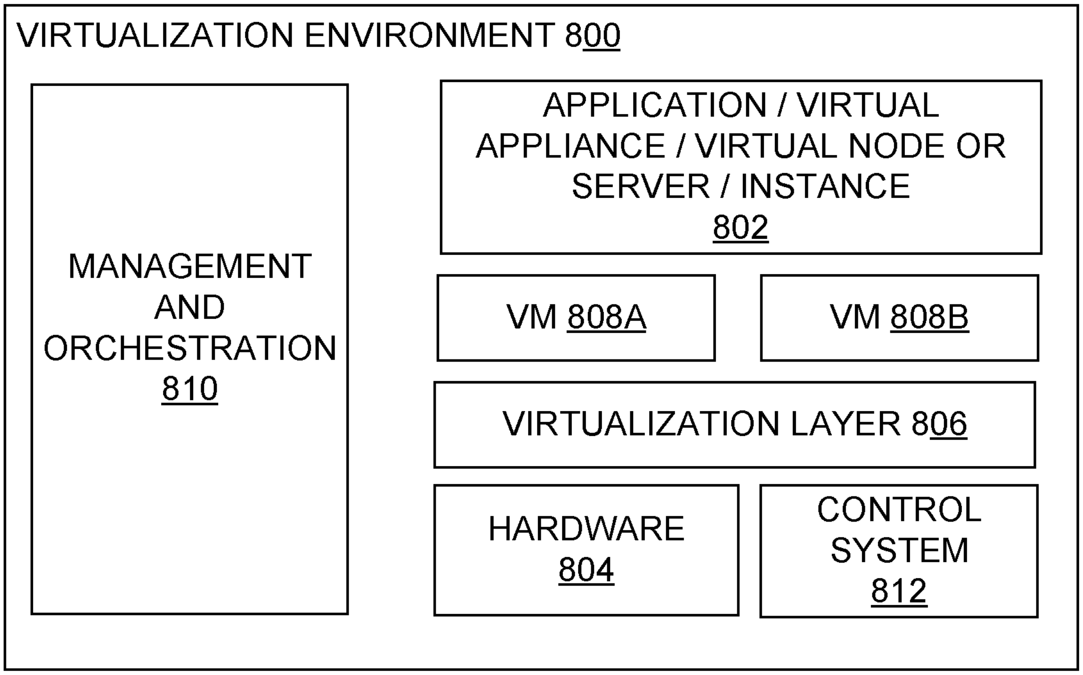
FIG. 8 is a block diagram illustrating a block diagram of a virtualization environment according to some embodiments of inventive concepts.

FIG. 8 is a block diagram illustrating a virtualization environment 800 in which functions implemented by some embodiments may be virtualized. In the present context, virtualizing means creating virtual versions of apparatuses or devices such as encoder 500 which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 800 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 802 (which may alternatively be called software instances, virtual appliances, network functions, virtual nodes, virtual network functions, etc.) are run in the virtualization environment 800 to implement some of the features, functions, and/or benefits of some of the embodiments disclosed herein.

Hardware 804 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 806 (also referred to as hypervisors or virtual machine monitors (VMMs)), provide VMs 808A and 808B (one or more of which may be generally referred to as VMs 808), and/or perform any of the functions, features and/or benefits described in relation with some embodiments described herein. The virtualization layer 806 may present a virtual operating platform that appears like networking hardware to the VMs 808.

The VMs 808 comprise virtual processing, virtual memory, virtual networking or interface and virtual storage, and may be run by a corresponding virtualization layer 806. Different embodiments of the instance of a virtual appliance 802 may be implemented on one or more of VMs 808, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 808 may be a software implementation of a physical machine that runs programs as if they were executing on a physical, non-virtualized machine. Each of the VMs 808, and that part of hardware 804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 808 on top of the hardware 804 and corresponds to the application 802.

Hardware 804 may be implemented in a standalone network node with generic or specific components. Hardware 804 may implement some functions via virtualization. Alternatively, hardware 804 may be part of a larger cluster of hardware (e.g. such as in a data center or CPE) where many hardware nodes work together and are managed via management and orchestration 810, which, among others, oversees lifecycle management of applications 802. In some embodiments, hardware 804 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 812 which may alternatively be used for communication between hardware nodes and radio units.

Figure 9:
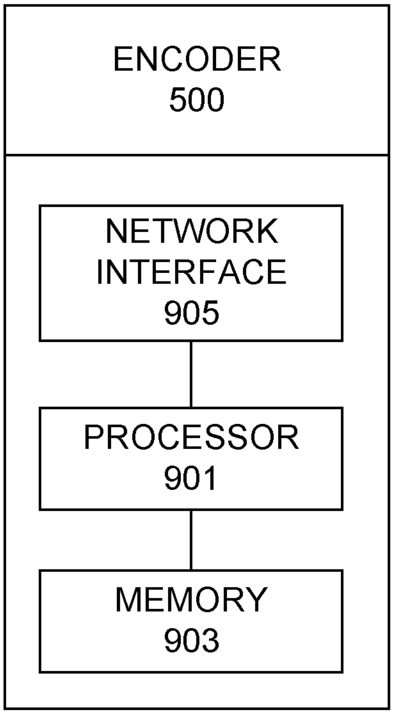
FIG. 9 is a block diagram illustrating an encoder according to some embodiments of inventive concepts.

FIG. 9 is a block diagram illustrating elements of encoder 500 configured to encode audio frames according to some embodiments of inventive concepts. As shown, encoder 500 may include a network interface circuitry 905 (also referred to as a network interface) configured to provide communications with other devices/entities/functions/etc. The encoder 500 may also include processor circuitry 901 (also referred to as a processor) coupled to the network interface circuitry 905, and a memory circuitry 903 (also referred to as memory) coupled to the processor circuit. The memory circuitry 903 may include computer readable program code that when executed by the processor circuitry 901 causes the processor circuit to perform operations according to embodiments disclosed herein.

According to other embodiments, processor circuitry 901 may be defined to include memory so that a separate memory circuit is not required. As discussed herein, operations of the encoder 500 may be performed by processor 901 and/or network interface 905. For example, processor 901 may control network interface 905 to transmit communications to decoder 708 and/or to receive communications through network interface 905 from one or more other network nodes/entities/servers such as other encoder nodes, depository servers, etc. Moreover, modules may be stored in memory 903, and these modules may provide instructions so that when instructions of a module are executed by processor 901, processor 901 performs respective operations.

Figure 1:
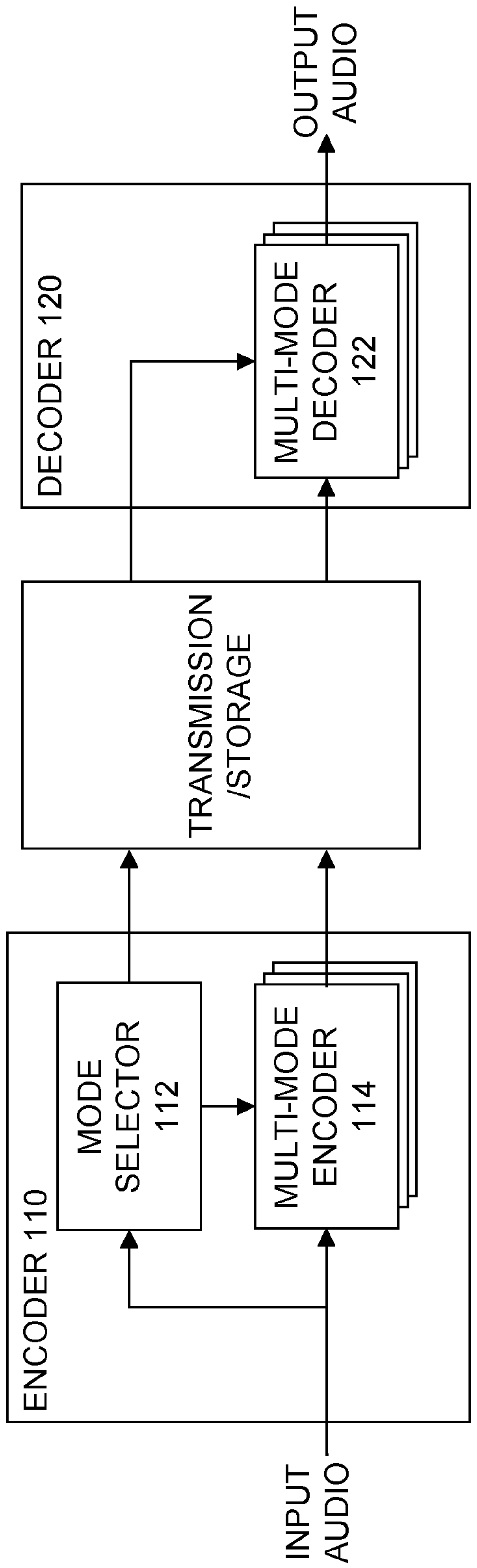
FIG. 1 is a block diagram illustrating a multimode audio codec using mode decision log based on an audio input signal.
Figure 2:
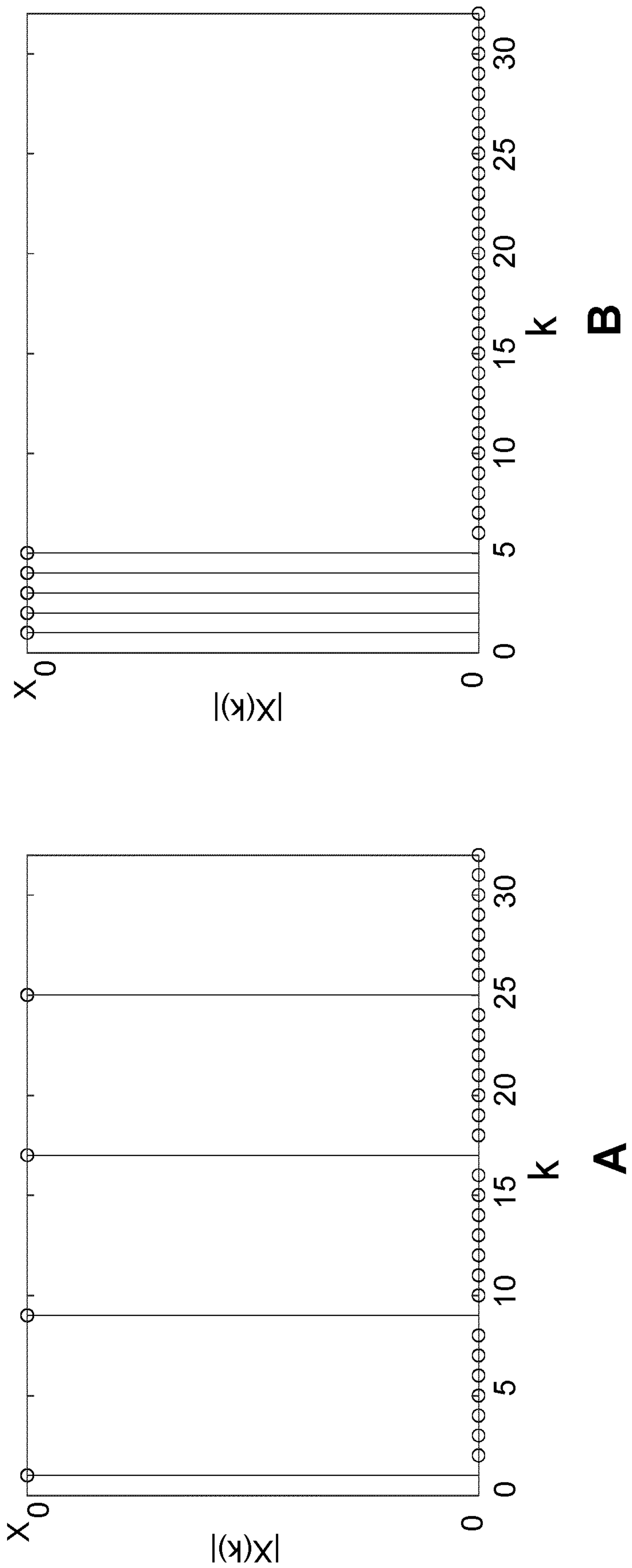
FIG. 2 is an illustration of spectrum that is acceptable and that is not acceptable according to some embodiments of inventive concepts.
Figure 3:
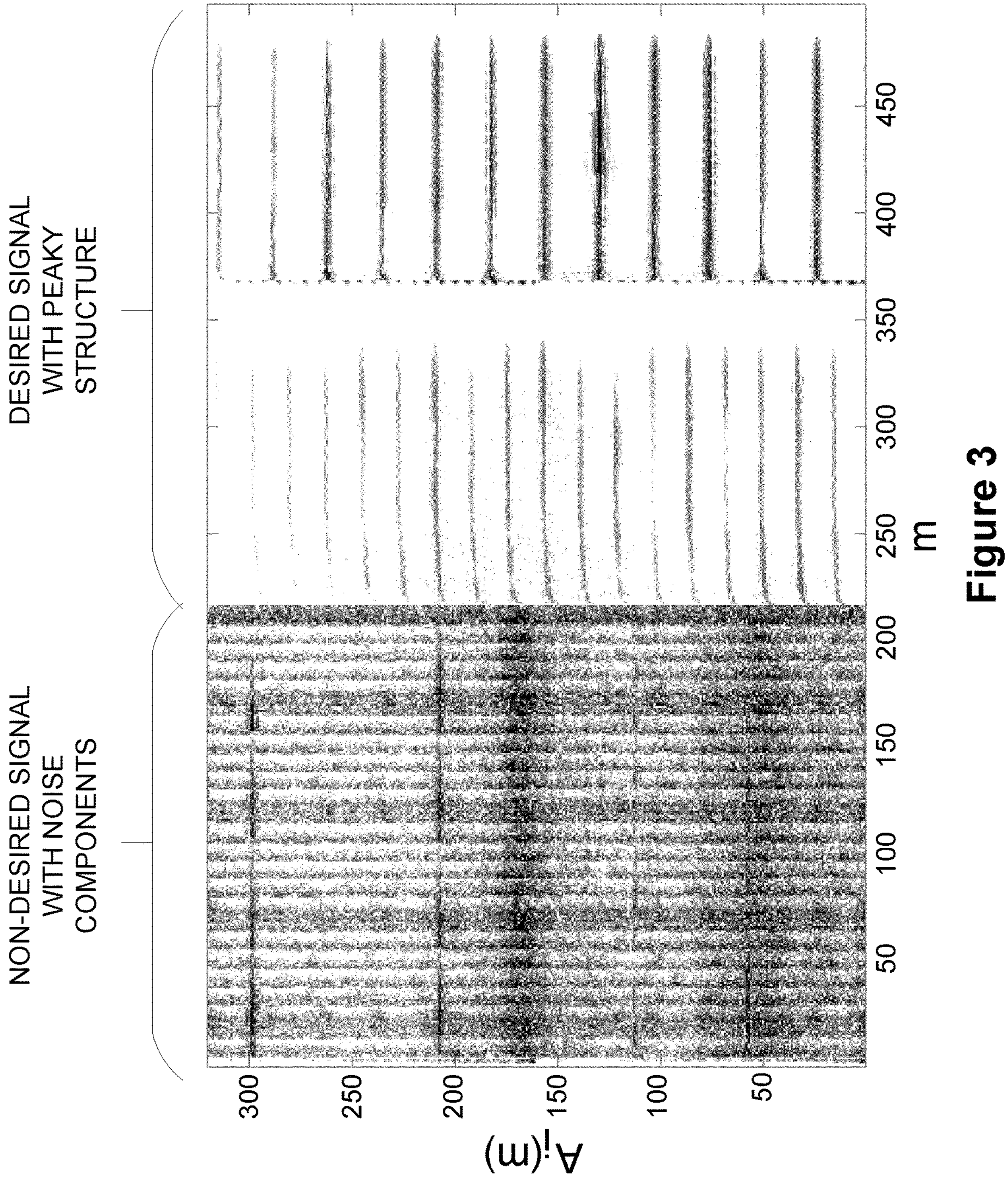
FIG. 3 is an illustration of a classification showing desired signal and non-desired signals according to some embodiments of inventive concepts.

As previously indicated a variety of speech-music classifiers are used in the field of audio coding. However, these classifiers may not be able to discriminate between different classes in the space of music signals. Many classifiers do not provide enough resolution to discriminate between classes which are needed in a complex multimode codec. In particular, the spectral flatness and crest values do not capture the spread or sparsity of the energy across the spectrum. In FIG. 2, two example spectra A and B are illustrated. Spectrum A is a sparse spectrum which is suitable for a certain encoding mode, while spectrum B is not suitable for this encoding mode. However, the spectral flatness and crest measures cannot discriminate between these spectra since they both yield identical values. FIG. 3 further illustrates spectra of signals that are desired respectively undesired to be encoded by a certain encoding mode.

Figure 4:
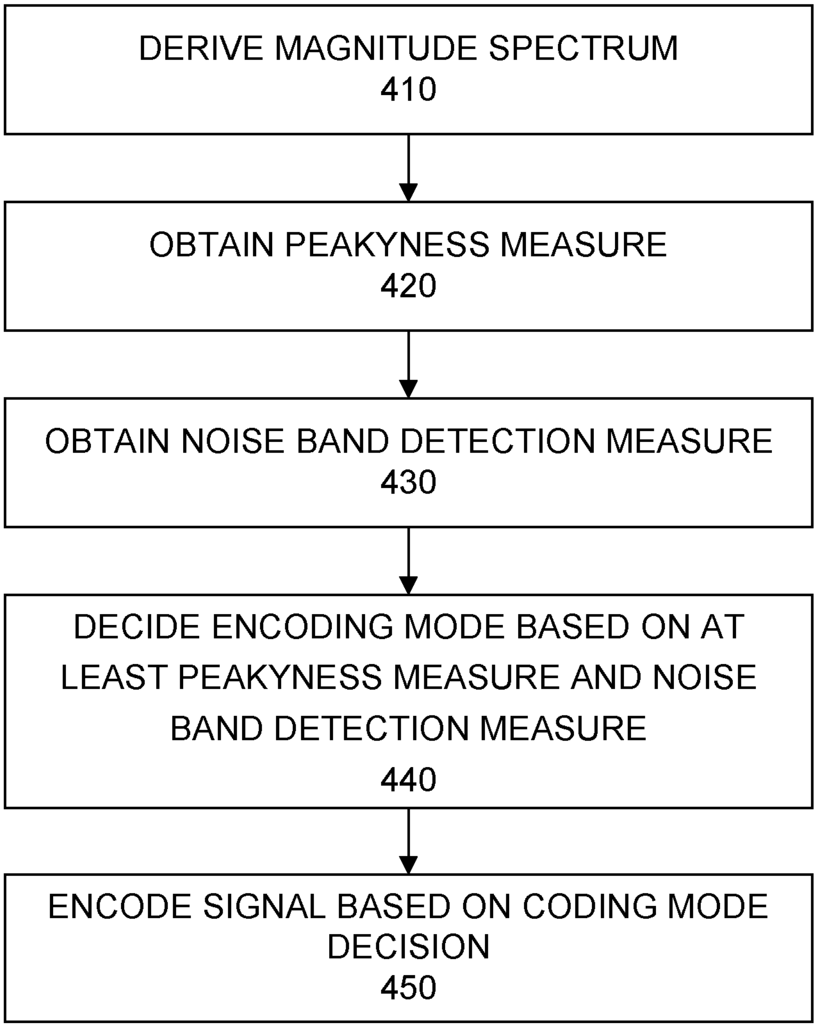
FIG. 4 is a flow chart illustrating operations of an encoder according to some embodiments of inventive concepts

FIG. 4 illustrates an abstraction of creating a classifier to determine the class of a signal which then controls the mode decision. These implementations deal with finding a better classifier for discrimination of harmonic and noise like music signals In some embodiments, the inventive concepts are part of an audio encoding and decoding system. The audio encoder is a multi-mode audio encoder and the method improves the selection of the appropriate coding mode for the signal. To clarify that this is the coding mode selected in the encoder we will hereafter refer to this as the encoding mode, although it is understood by people skilled in the art that these terms may be used interchangeably. The input signal x(m, n), n=0, 1, 2, . . . L−1 is segmented into audio frames of length L where m denotes the frame index and n denotes the sample index within the frame. The input signal is transformed to a frequency domain representation, such as the Modified Discrete Cosine Transform (MDCT) or the Discrete Fourier Transform (DFT). Other frequency domain representations are also possible, such as filter banks, but they should provide a reasonably high frequency resolution for the targeted analysis range. In this embodiment, at least one of the audio encoding modes operates in MDCT domain. Therefore, it is beneficial to reuse the same transform for the frequency domain analysis. The MDCT is defined by the following relation $$X(m,k)=\sum_{n=0}^{2L-1} x(m,n)w_a(n)\cos\left(n+\frac{1}{2}+\frac{L}{2}\right)\left(k+\frac{1}{2}\right)$$

where X(m, k) denotes the MDCT spectrum of frame m at frequency index k and $w_a(n)$ is an analysis window. The frequency index k may also be referred to as a frequency bin. Typically, the audio frames are extracted with a time overlap. The analysis window is selected to give a good trade-off between e.g. algorithmic delay, frequency resolution and shaping of the quantization noise. If the frequency domain representation would be based on a DFT the spectrum would be defined according to $$X(m,k)=\sum_{n=0}^{L-1} x(m,n)e^{-i\frac{2\pi}{N}kn}$$

Note that the frame length L may be different in this case to give a suitable frame length for the DFT analysis.

The signal classification aims to select the encoding mode which can represent the input audio file the best way. In particular, the classification aims to identify signals which have a high peakyness and a low concentration of energy. The analysis may be focused on a critical frequency region where the choice of encoding method has a large impact. Here, we focus on a range of the spectrum X(m, k) defined by the frequency indices $k=k_{start} \ldots k_{end}$. In some of these embodiments, the critical range is the upper half of the frequency spectrum which is encoded with a bandwidth extension technology. This corresponds to $k_{start}=320$ and $k_{end}=639$, where the operating sampling rate is 32 kHz and the frame length is L=640. The bandwidth extension for the different encoding modes has a difference in spectral signature that makes it critical for the mode selection. In more detail, it is the objective to identify the signals which have a peaky structure in the high frequency range, but do not have noisy components characterized by a broad band of high energy coefficients in the spectrum. An illustration of the desired signals and non-desired signals can be found in FIG. 3. This is implemented by analyzing the feature crest (m) and a novel feature $crest_{mod}(m)$.

FIG. 4 illustrates operations an encoder performs in some embodiments of inventive concepts. Turning to FIG. 4, in step 410 a magnitude or absolute spectrum $A_i(m)$ of the critical region is obtained by the encoder 500. The magnitude or absolute spectrum $A_i(m)$ of the critical region can be obtained by the encoder 500 in accordance with $$A_0(m)=|X(m,k_{start})|$$
$$A_1(m)=|X(m,k_{start}+1)|$$
$$\vdots$$
$$A_{M-1}(m)=|X(m,k_{end})|$$

where $M=k_{end}-k_{start}+1$ is the number of bins or frequency indices in the critical band. In step 420, the crest value for frame m is derived by the encoder 500 according to $$\text{crest}(m) = \frac{\max(A_i(m))}{\sqrt{\frac{1}{M}\sum_{i=0}^{M-1} A_i(m)^2}}$$

where crest(m) gives a measure of the peakyness of frame m. A complementary peakyness measure t(m) may also be obtained by the encoder 500 according to $$t(m) = \sum_{i=0}^{M-1} \text{low}(A_i(m))$$

$$\text{low}(A_i(m)) = \begin{cases} 1, & A_i(m) < A_{thr}\max(A_i(m)) \\ 0, & A_i(m) \geq A_{thr}\max(A_i(m)) \end{cases}$$

where $A_{thr}$ is a relative threshold where a suitable value may be $A_{thr}=0.1$ or in the range [0.01, 0.4]. In step 430, a detection measure for a noise band is calculated by the encoder 500 according to $$\text{crest}_{mod}(m) = \frac{\max(movmean(A_i(m), W))}{\sqrt{\frac{1}{M}\sum_{i=0}^{M-1} A_i^2}}$$

where movmean($A_i$(m), W) is the moving mean of the absolute spectrum $A_i$(m) using a window size of W. A suitable value for the window size may be W=21 or any odd number in the range [7, 31].

In one embodiment of inventive concepts, movemean($A_i$(m), W) is defined according to $$movmean\,(A_i(m), W) = \frac{1}{b-a+1}\sum_{i=a}^{b} A_i(m)$$

$$a = \max\big(0,\, i-(W-1)/2\big)$$

$$b = \min\big(M-1,\, i+(W-1)/2\big)$$

Here, the mean at the edges of the absolute spectrum $A_i$(m) are formed using only the values that are inside the range of $A_i$(m).

Alternatively, the definition may be written in a recursive form which requires fewer computational operations:

$$movmean(A_i(m), W) =$$

$$\begin{cases} \frac{1}{\frac{W-1}{2}+1}\sum_{i=0}^{\frac{W-1}{2}} A_i(m), \qquad i=0 \\ movmean(A_{i-1}(m), W) + \frac{1}{i+\frac{W-1}{2}+1}\Big(A_{i+\frac{W-1}{2}}(m) - \\ movmean(A_{i-1}(m), W)\Big),\ 0 < i \leq (W-1)/2 \\ movmean(A_{i-1}(m), W) + \frac{1}{W}\Big(A_{i+\frac{W-1}{2}}(m) - A_{i\frac{W-1}{2}-1}(m)\Big), \\ (W-1)/2 < i \leq M-(W-1)/2-1 \\ \begin{cases} movmean(A_{i-1}(m), W) - \frac{1}{M-i+(W-1)/2}(movmean(A_{i-1}(m), \\ W) - A_{i-(W-1)/2-1}(m)),\ M-(W-1)/2-1 < i \leq M-1 \end{cases} \end{cases}$$

In another embodiment, the definition of movmean($A_i$(m), W) may assume that the absolute spectrum is zero outside the range of i=0 . . . M−1, which simplifies the numerator in the expression according to $$movmean(A_i(m), W) = \frac{1}{W}\sum_{i=a}^{b} A_i(m)$$

$$a = \max\big(0,\, i-(W-1)/2\big)$$

$$b = \min\big(M-1,\, i+(W-1)/2\big)$$

Note that the definitions on movmean($A_i$(m), W) assume that the window length W is an odd number, extending the same number of samples in the positive and negative direction from the current frequency bin i. It would be possible to use an even window length W, with the appropriate adaptations to the equations above. For instance movmean ($A_i$(m), W) with even W could be written as $$movmean(A_i(m), W) = \frac{1}{b-a+1}\sum_{i=a}^{b} A_i(m)$$

$$a = \max\big(0,\, i-W/2\big)$$

$$b = \min\big(M-1,\, i+W/2-1\big)$$

if one were to only use the window shifted backwards, or $$movmean(A_i(m), W) = \frac{1}{2}\left(\frac{1}{b-a+1}\sum_{i=a}^{b} A_i(m) + \frac{1}{d-c+1}\sum_{i=c}^{a} A_i(m)\right)$$

$$a = \max\big(0,\, i-W/2\big)$$

$$b = \min\big(M-1,\, i+W/2-1\big)$$

$$c = \max\big(0,\, i-W/2\big)$$

$$d = \min\big(M-1,\, i+W/2-1\big)$$

if one were to compute the average of the backward and forward alignment of the window. Generally, the moving mean operation can be implemented with a moving average filter of the form $$y(i) = \sum_{j=0}^{W-1} A_{i-j}(m) w_j$$

where $w_j$ are filter coefficients.

$\text{crest}_{mod}$(m) gives a measure of local concentration of energy, indicating a noise band in the spectrum. To stabilize the decision, crest(m) and $\text{crest}_{mod}$(m) may be low pass filtered by the encoder 500. For example, $$\text{crest}_{LP}(m) = (1-\alpha)\cdot\text{crest}(m) + \alpha\cdot\text{crest}_{LP}(m-1)$$

$$\text{crest}_{mod,LP}(m) = (1-\beta)\cdot\text{crest}_{mod}(m) + \beta\cdot\text{crest}_{mod,LP}(m-1)$$

where α and β are filter coefficients. A suitable value for α may be α=0.97 or in the range [0.5, 1), and equivalently a suitable value for β may be β=0.97 or in the range [0.5, 1).

An encoding mode targeted for peaky spectra without noisy components is disabled if the following condition is met:

$$\text{Harmonic\_decision}(m) = \begin{cases} \text{FALSE}, & \text{crest}_{LP}(m) > \text{crest}_{thr},\ \text{crest}_{mod,LP}(m) > \text{crest}_{mod,thr},\ t(m) > t_{thr} \\ \text{TRUE}, & \text{otherwise} \end{cases}$$

where $\text{crest}_{thr}$, $\text{crest}_{mod,thr}$ and $t_{thr}$ are decision thresholds. Suitable values for these threshold may be $\text{crest}_{thr}=7$, $\text{crest}_{mod,thr}=2.128$ and $t_{thr}=220$. More generally, the suitable values may be found in the ranges $\text{crest}_{thr} \in [3, 12]$, $\text{crest}_{mod,thr} \in [1, 4]$ and $t_{thr} \in [150, 300]$. Breaking down these conditions, $\text{crest}_{mod,LP}(m)>\text{crest}_{mod,thr}$ ensures the encoding mode is disabled for noisy components, while $\text{crest}_{LP}(m)>\text{crest}_{thr}$ and $t(m)>t_{thr}$ limits the impact of this decision to signals that have a peaky spectrum.

Alternatively, the condition on t(m) can be omitted and the decision becomes $$\text{Harmonic\_decision}(m) = \begin{cases} \text{FALSE}, & \text{crest}_{LP}(m) > \text{crest}_{thr},\ \text{crest}_{mod,LP}(m) > \text{crest}_{mod,thr} \\ \text{TRUE}, & \text{otherwise} \end{cases}$$

In another embodiment of inventive concepts, the decision may be formed such that a harmonic mode is enabled if the $\text{crest}_{LP}(m)$ is high while the $\text{crest}_{LP,mod}(m)$ is low, according to $$\text{Harmonic\_decision}(m) = \begin{cases} \text{TRUE}, & \text{crest}_{LP}(m) > \text{crest}_{thr2},\ \text{crest}_{mod,LP}(m) < \text{crest}_{mod,thr2} \\ \text{FALSE}, & \text{otherwise} \end{cases}$$

where the thresholds $\text{crest}_{thr1}$ and $\text{crest}_{mod,thr2}$ may be similar to $\text{crest}_{thr}$ and $\text{crest}_{mod,thr}$.

In step 440 the encoding mode is selected by the encoder 500, including at least the decision Harmonic_decision(m). Finally, the encoder 500 performs the encoding using the selected encoding mode in step 450.

Figure 5:
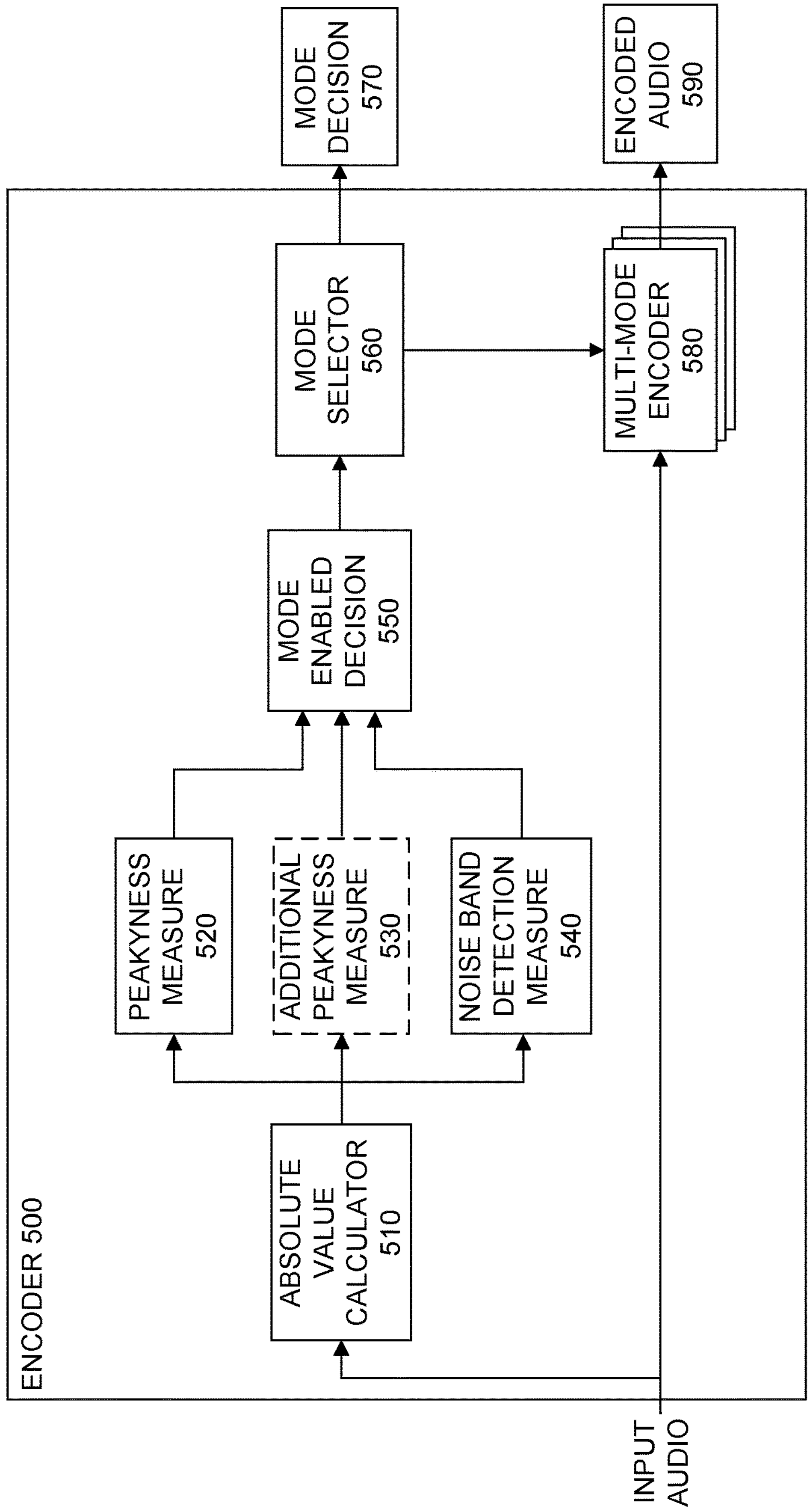
FIG. 5 is a block diagram illustrating a multimode audio codec using mode decision log based on an audio input signal according to some embodiments of inventive concepts.

FIG. 5 is an overview illustration of a multimode audio codec using mode decision logic based on the input signal. Turing to FIG. 5, the absolute value calculator 510 receives the input audio, transforms the input audio into a frequency domain representation, such as the Modified Discrete Cosine Transform (MDCT). If the signal is already transformed to frequency domain to be used in the multi-mode encoder, the frequency domain representation may be re-used in this step. The absolute value calculator 510 then determines the absolute value (e.g., the magnitude) of the MDCT. The absolute magnitude is used by peakyness measure 520 to determine the peakyness measure of the MDCT. An additional peakyness measure 530 may also be derived.

Noise detection measure 540 receives the absolute value of the MDCT and determines the noisiness of the input audio signal. Mode enable decision 550 receives the peakyness measures and noise detection measure and decides whether to enable a mode to be selected. For example, if there are two encoding modes, the mode enable decision 550 determines which of the two encoding modes can be used.

Mode selector 560 determines the encoding mode to use and indicates to multi-mode encoder 580 which mode is to be used. The multi-mode encoder 580 encodes the input audio signal and produces encoded audio 590. The determined mode decision 570 is combined with the encoded audio 590 to be transmitted or stored for a multi-mode decoder.

Figure 6A:
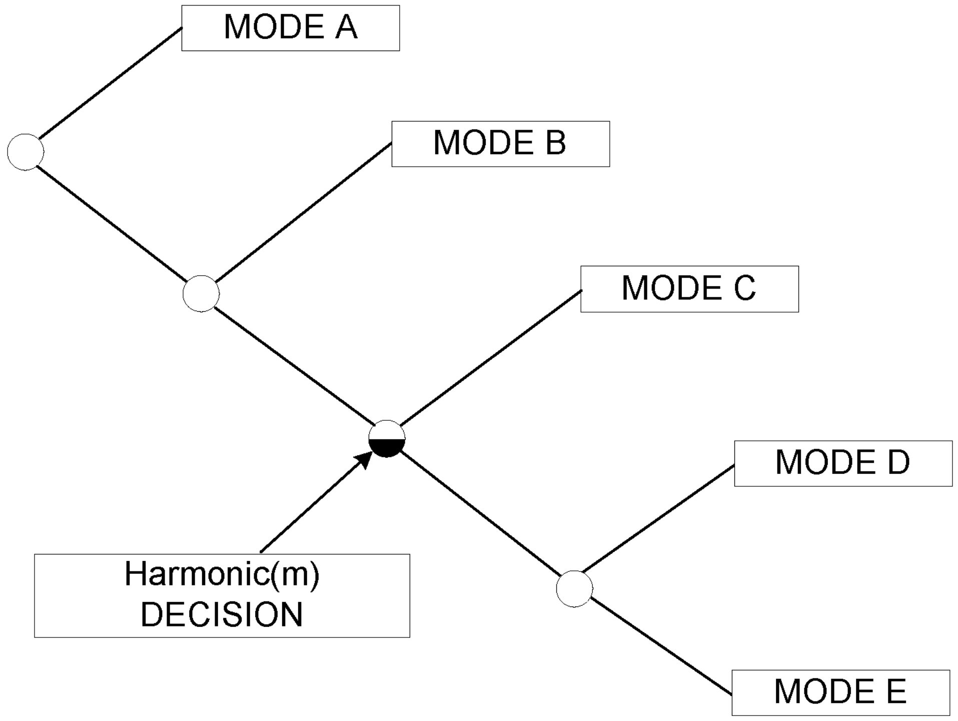
FIGS. 6A and 6B are illustrations of a decision tree according to some embodiments of inventive concepts.
Figure 6B:
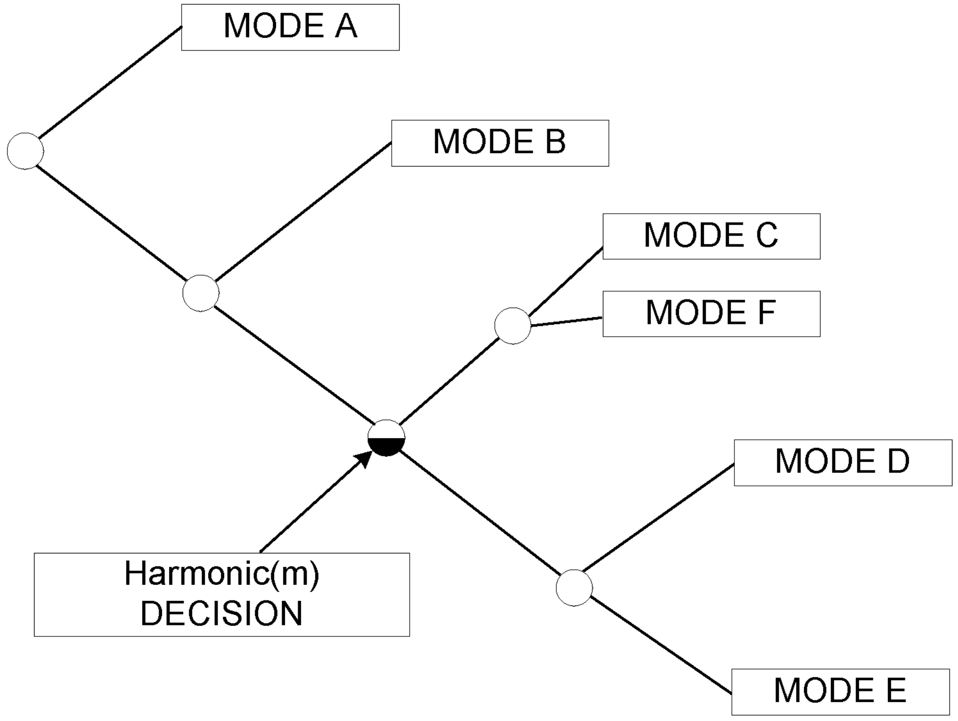

FIG. 6A illustrates an example of which encoding mode or group of encoding modes is used. Responsive to the harmonic condition being true (e.g., harmonic_decision(m) being true), encoding mode C is determined to be used. Responsive to the harmonic condition being false (e.g., harmonic_decision(m) being false), encoding mode D or encoding mode E is determined to be used. FIG. 6B illustrates an example where both branches have a group of encoding modes. In FIG. 6B, responsive to the harmonic condition being true (e.g., harmonic_decision(m) being true), encoding mode C or encoding mode F is determined to be used. Responsive to the harmonic condition being false (e.g., harmonic_decision(m) being false), encoding mode D or encoding mode E is determined to be used.

Operations of the encoder 500 (implemented using the structure of the block diagram of FIG. 9) will now be discussed with reference to the flow chart of FIG. 10 according to some embodiments of inventive concepts. For example, modules may be stored in memory 903 of FIG. 9, and these modules may provide instructions so that when the instructions of a module are executed by respective communication device processing circuitry 901, processing circuitry 901 performs respective operations of the flow chart.

Figure 10:
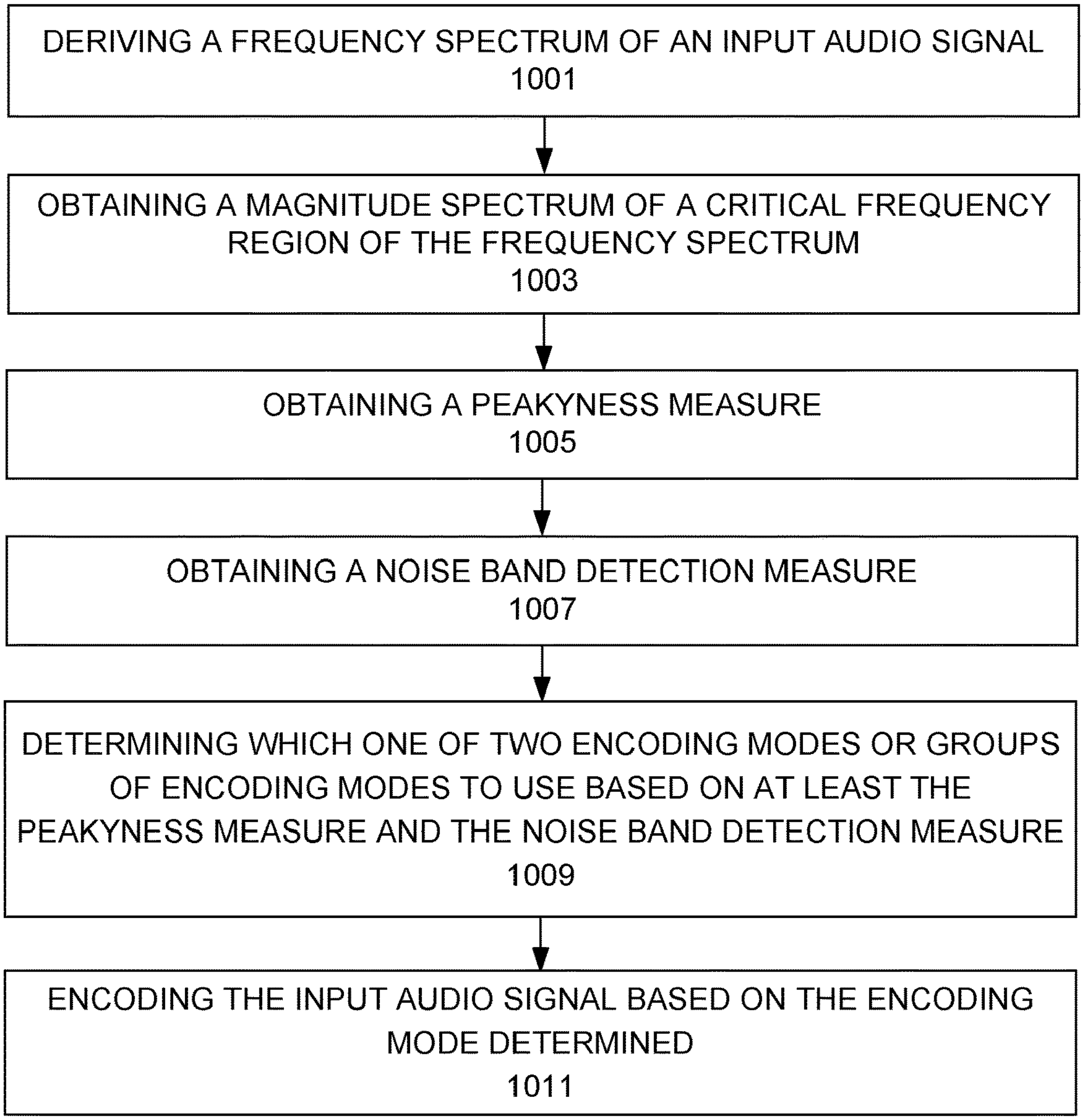
FIGS. 10-12 are flow charts illustrating operations of an encoder according to some embodiments of inventive concepts

Turning to FIG. 10, in block 1001, the processing circuitry 901 derives a frequency spectrum of an input audio signal. In some embodiments of inventive concepts, the processing circuitry 901 derives the frequency spectrum by segmenting the input audio signal x(m, n), n=0, 1, 2, . . . L−1 into audio frames of length L where m denotes a frame index and n denotes a sample index within the frame, transforming the input audio signal in a frequency domain representation in accordance with $$X(m, k) = \sum_{k=0}^{2L-1} x(m, n) w_a(n) \cos\left(n + \frac{1}{2} + \frac{L}{2}\right)\left(k + \frac{1}{2}\right)$$

In block 1003, the processing circuitry 901 obtains a magnitude of a critical frequency region of the frequency spectrum. The critical frequency region is defined by frequency indices $k=k_{start} \ldots k_{end}$ where the critical frequency range is an upper half of X(m, k). In some embodiments, the critical frequency range corresponds to $k_{start}=320$ and $k_{end}=639$ where the operating sampling rate is 32 kHz and the frame length is L=640

In some embodiments of inventive concepts, the processing circuitry 901 obtains the magnitude of the critical frequency region in accordance with $$A_0(m) = |X(m, k_{start})|$$
$$A_1(m) = |X(m, k_{start} + 1)|$$
$$\vdots$$
$$A_{M-1}(m) = |X(m, k_{end})|$$

where $M=k_{end}-k_{start}+1$ is the number of bins in a critical band associated with the critical frequency region.

In block 1005, the processing circuitry 901 obtains a peakyness measure. In some embodiments of inventive concepts, the processing circuitry 901 obtains the peakyness measure in accordance with $$\text{crest}(m) = \frac{\max(A_i(m))}{\sqrt{\frac{1}{M}\sum_{i=0}^{M-1} A_i(m)^2}}$$

where crest(m) gives a measure of the peakyness of frame m.

In other embodiments of inventive concepts, the processing circuitry 901 obtains the peakyness measure of the frame in accordance with $$t(m) = \sum_{i=0}^{M-1} \text{low}(A_i(m))$$

$$\text{low}(A_i(m)) = \begin{cases} 1, & A_i(m) < A_{thr} \max(A_i(m)) \\ 0, & A_i(m) \geq A_{thr} \max(A_i(m)) \end{cases}$$

where $A_{thr}$ is a relative threshold.

In some embodiments, $A_{thr}$=0.1. In other embodiments, $A_{thr}$ is in a range [0.01, 0.4]

In block 1007, the processing circuitry 901 obtains a noise band detection measure. In some embodiments of inventive concepts, the processing circuitry 901 obtains the noise band detection measure in accordance with $$\text{crest}_{mod}(m) = \frac{\max(movmean(A_i(m), W))}{\sqrt{\frac{1}{M}\sum_{i=0}^{M-1} A_i^2}}$$

where $\text{crest}_{mod}$(m) is the noise band detection measure, movmean($A_i$(m), W) is a moving mean of the absolute spectrum $A_i$(m) using a window size of W.

In some embodiments, the processing circuitry 901 determines movmean($A_i$(m), W) in accordance with $$movmean(A_i(m), W) = \frac{1}{b-a+1}\sum_{i=a}^{b} A_i(m)$$

$$a = \max(0, i-(W-1)/2)$$

$$b = \min(M-1, i+(W-1)/2)$$

In block 1009, the processing circuitry determines which one of the two encoding modes or groups of encoding modes to use based on at least the peakyness measure and the noise band detection measure. For example, a sparse spectrum may be suitable for a first encoding mode or set of encoding modes but not for a second encoding mode or set of encoding modes.

In some embodiments of inventive concepts, the processing circuitry 901 determines which of two encodings mode or groups of encoding modes to use based on at least the peakyness measure, the noise band detection measure by determining which of the two encoding modes to use based on when Harmonic_decision(m) is true wherein Harmonic_decision(m) is determined in accordance with $$\text{Harmonic\_decision}(m) = \begin{cases} \text{FALSE}, & \text{crest}_{LP}(m) > \text{crest}_{thr},\ \text{crest}_{mod,LP}(m) > \text{crest}_{mod,LP},\ t(m) > t_{thr} \\ \text{TRUE}, & \text{otherwise} \end{cases}$$

where $\text{crest}_{thr}$, $\text{crest}_{mod,thr}$ and $t_{thr}$ are decision thresholds, $\text{crest}_{LP}$(m) is a low pass filtered crest(m) and $\text{crest}_{mod,LP}$(m) is a low pass filtered $\text{crest}_{mod}$(m).

The processing circuitry 901 can determine the low pass filtered crest(m) and the low pass filtered $\text{crest}_{mod}$(m) in accordance with $$\text{crest}_{LP}(m) = (1-\alpha)\cdot\text{crest}(m) + \alpha\cdot\text{crest}_{LP}(m-1)$$

$$\text{crest}_{mod,LP}(m) = (1-\beta)\cdot\text{crest}_{mod}(m) + \beta\cdot\text{crest}_{mod,LP}(m-1)$$

where α and β are filter coefficients. In some embodiments, α is in the range of [0.5, 1) and β is in the range of [0.5, 1). In other embodiments, the Harmonic_decision(m) is determined according to $$\text{Harmonic\_decision}(m) = \begin{cases} \text{FALSE}, & \text{crest}_{LP}(m) > \text{crest}_{thr},\ \text{crest}_{mod,LP}(m) > \text{crest}_{mod,thr} \\ \text{TRUE}, & \text{otherwise} \end{cases}$$

In other embodiments, the processing circuitry 901 determines which of two encodings mode to use based on at least the peakyness measure, the noise band detection measure by determining which of the two encoding modes to use based on when Harmonic_enabled(m) is true wherein Harmonic_enabled(m) is determined in accordance with $$\text{Harmonic\_decision}(m) = \begin{cases} \text{TRUE}, & crest_{LP}(m) > crest_{thr2},\ crest_{mod,LP}(m) < crest_{mod,thr2} \\ \text{FALSE}, & \text{otherwise} \end{cases}$$

wherein where $\text{crest}_{thr1}$ and $\text{crest}_{mod,thr2}$ are decision thresholds.

Thus, the processing circuitry 901 determines the encoding mode based on at least the peakyness measure, the noise band detection measure, and Harmonic_decision(m).

Figure 11:
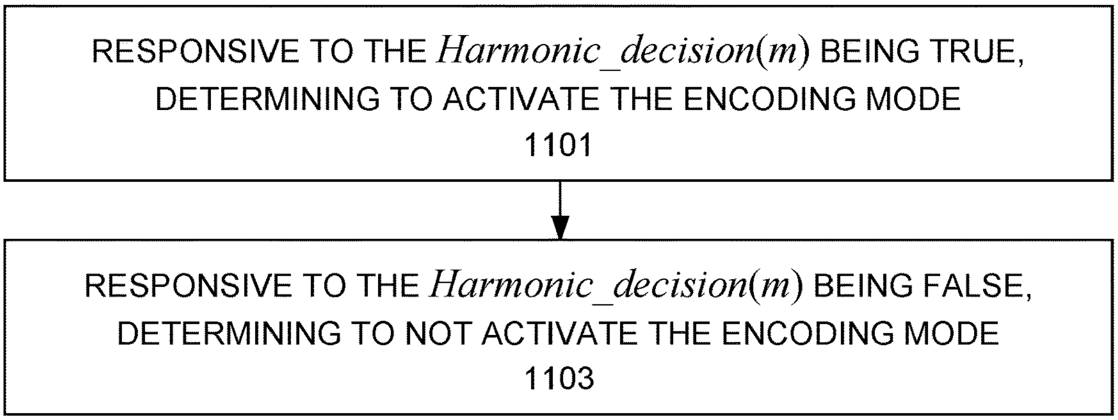

Turning to FIG. 11, in some embodiments of inventive concepts, the processing circuitry 901, in block 1101, responsive to the Harmonic_decision(m) being TRUE, determines to use a first one of the two encoding modes or a first one from a group of encoding modes. In block 1103, the processing circuitry 901, responsive to the Harmonic_decision(m) being FALSE, determines to use a second one of the two encoding modes or a second one from a group of encoding modes.

Returning to FIG. 10, in block 1011, the processing circuitry 901 encodes the input audio signal based on the encoding mode determined to use.

Figure 12:
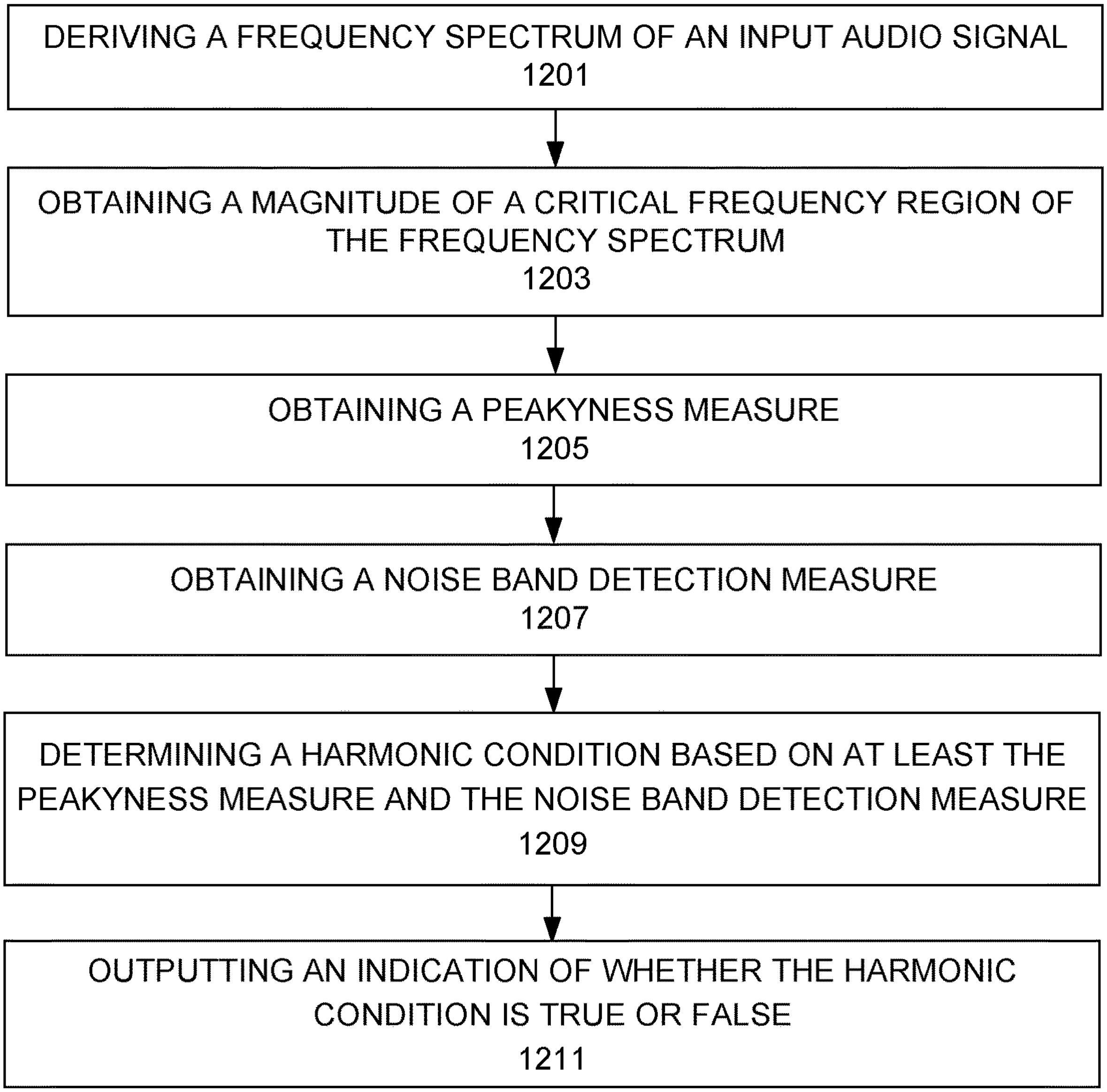

In other embodiments of inventive concepts, the inventive concepts described herein can be used to determine whether an input audio signal has high peakyness and low energy concentration. FIG. 12 illustrates one embodiment of determining whether an input audio signal has high peakyness and low energy concentration.

Turning to FIG. 12, in block 1201, the processing circuitry 901 derives a frequency spectrum of an input audio signal. Block 1201 is analogous to block 1001 described above.

In block 1203, the processing circuitry 901 obtains a magnitude of a critical frequency region of the frequency spectrum. Block 1203 is analogous to block 1003 described above.

In block 1205, the processing circuitry 901 obtains a peakyness measure. Block 1205 is analogous to block 1005 described above.

In block 1207, the processing circuitry 901 obtains a noise band detection measure. Block 1207 is analogous to block 1007 described above.

In block 1209, the processing circuitry 901 determines a harmonic condition based on at least the peakyness measure and the noise band detection measure.

In block 1211, the processing circuitry 901 outputs an indication of whether the harmonic condition is true or false.

The processing circuitry 901 in some embodiments determines that the harmonic condition is true responsive to a low pass filtered crest(m) being greater than a crest threshold and a low pass filtered $crest_{mod}(m)$ being greater than a $crest_{mod}$ threshold, wherein crest(m) is a measure of the peakyness of frame m and $crest_{mod}(m)$ is a measure of a local concentration of energy.

The processing circuitry 901, in some embodiments of inventive concepts, determines crest(m) and $crest_{mod}(m)$ in accordance with $$crest(m) = \frac{\max(A_i(m))}{\sqrt{\frac{1}{M}\sum_{i=0}^{M-1} A_i(m)^2}}$$

$$crest_{mod}(m) = \frac{\max(movmean(A_i(m), W))}{\sqrt{\frac{1}{M}\sum_{i=0}^{M-1} A_i^2}}$$

where $A_i(m)$ is a magnitude of a modified discrete cosine transform (MDCT) of an audio signal at frame m, M is a number of frequency indices in a critical region, and movmean($A_i(m)$, W) is a moving mean of $A_i(m)$ using a window size W.

The processing circuitry 901 determines $A_i(m)$ in accordance with $$A_0(m) = |X(m,\ k_{start})|$$

$$A_1(m) = |X(m,\ k_{start} + 1)|$$

$$\vdots$$

$$A_{M-1}(m) = |X(m,\ k_{end})|$$

where X(m, k) denotes the MDCT spectrum of frame m at frequency index k and $M=k_{end}-k_{start}+1$ where $k_{end}$ and $k_{start}$ are frequency indices of the critical region of X(m, k).

Various embodiments of determining movmean($A_i(m)$, W) are described above.

The processing circuitry 901 determines X(m, k) in accordance with $$X(m, k) = \sum_{n=0}^{L-1} x(m, n)e^{-i\frac{2\pi}{N}kn}$$

where L is a frame length of frame m.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Embodiments

1. A method in an encoder to determine which of two encoding modes or groups of encoding modes to use, the method comprising:
   deriving (901) a frequency spectrum of an input audio signal;
   obtaining (903) a magnitude of a critical frequency region of the frequency spectrum;
   obtaining (905) a peakyness measure of the frame;
   obtaining (907) a noise band detection measure;
   determining (909) which one of the two encoding modes or groups of encoding modes to use based on at least the peakyness measure and the noise band detection measure; and
   encoding (911) the input audio signal based on the encoding mode determined to use.
2. The method of Embodiment 1, wherein encoding the input audio signal based on the encoding mode determined to use comprises:
   responsive to a group of encoding modes being determined to use, selecting one encoding mode of the group of encoding modes to use to encode the input audio signal.
3. The method of any of Embodiments 1-2, wherein deriving the frequency spectrum comprises deriving a frequency spectrum X(m, k), where X(m, k) denotes the frequency spectrum for frame m at frequency index k.

4. The method of any of Embodiments 1-3, wherein deriving the frequency spectrum comprises:

segmenting the input audio signal x(m, n), n=0, 1, 2, . . . L−1 into audio frames of length L where m denotes a frame index and n denotes a sample index within the frame;

transforming the input audio signal in a frequency domain representation in accordance with $$X(m,k)=\sum_{k=0}^{2L-1}x(m,n)w_a(n)\cos\left(n+\frac{1}{2}+\frac{L}{2}\right)\left(k+\frac{1}{2}\right)$$

where X(m, k) denotes a modified discrete cosine transform, MDCT, frequency spectrum of frame m at frequency index k and $w_a(n)$ is an analysis window;

obtaining the magnitude spectrum of X(m, k) defined by frequency indices $k=k_{start} \ldots k_{end}$ where the critical frequency range is an upper half of X(m, k).

5. The method of any of Embodiments 3-4, wherein the critical frequency range corresponds to $k_{start}=320$ and $k_{end}=639$ where the input sampling rate is 32 kHz and the frame length is L=640.

6. The method of any of Embodiments 3-5, wherein obtaining the magnitude of the critical frequency region comprises obtaining the magnitude of the critical frequency region in accordance with $$A_0(m)=|X(m,k_{start})|$$
$$A_1(m)=|X(m,k_{start}+1)|$$
$$\vdots$$
$$A_{M-1}(m)=|X(m,k_{end})|$$

where $M=k_{end}-k_{start}+1$ is the number of frequency indices in a critical band associated with the critical frequency region.

7. The method of Embodiment 6, wherein obtaining the peakyness measure comprises obtaining the peakyness measure in accordance with $$crest(m)=\frac{\max(A_i(m))}{\sqrt{\frac{1}{M}\sum_{k=0}^{M-1}A_i(m)^2}}$$

where crest(m) gives a measure of the peakyness of frame m.

8. The method of Embodiment 6, wherein obtaining the peakyness measure comprises obtaining the peakyness measure in accordance with $$t(m)=\sum_{i=0}^{M-1}\mathrm{low}(A_i(m))$$

$$\mathrm{low}(A_i(m))=\begin{cases}1, & A_i(m)<A_{thr}\max(A_i(m))\\ 0, & A_i(m)\geq A_{thr}\max(A_i(m))\end{cases}$$

where $A_{thr}$ is a relative threshold.

9. The method of Embodiment 8, wherein $A_{thr}=0.1$

10. The method of Embodiment 8, wherein $A_{thr}$ is in a range [0.01,0.4].

11. The method of any of Embodiments 1-10, wherein obtaining the noise band detection measure comprises obtaining the noise band detection measure in accordance with $$crest_{mod}(m)=\frac{\max(movmean(A_i(m),W))}{\sqrt{\frac{1}{M}\sum_{k=0}^{M-1}A_i^2}}$$

where $crest_{mod}(m)$ is the noise band detection measure, $movmean(A_i(m), W)$ is a moving mean of the absolute spectrum $A_i(m)$ using a window size of W.

12. The method of Embodiment 11 wherein $movmean(A_i(m), W)$ is determined in accordance with $$movmean(A_i(m),W)=\frac{1}{b-a+1}\sum_{i=a}^{b}A_i(m)$$

$$a=\max(0,i-(W-1)/2)$$

$$b=\min(M-1,i+(W-1)/2)$$

13. The method of any of Embodiments 7-12, further comprising low pass filtering crest(m) and $crest_{mod}(m)$ according to $$crest_{LP}(m)=(1-\alpha)\cdot crest(m)+\alpha\cdot crest_{LP}(m-1)$$

$$crest_{mod,LP}(m)=(1-\beta)\cdot crest_{mod}(m)+\beta\cdot crest_{LP}(m-1)$$

where α and β are filter coefficients.

14. The method of Embodiment 13, wherein α is in the range of [0.5,1) and β is in the range of [0.5,1).

15. The Embodiment of any of Claims 1-14, wherein determining which of two encodings mode to use based on at least the peakyness measure and the noise band detection measure comprises determining which of the two encoding modes to use based on when Harmonic_decision(m) is true wherein Harmonic_decision(m) is determined in accordance with $$\text{Harmonic\_decision}(m)=\begin{cases}\text{FALSE}, & crest_{LP}(m)>crest_{thr},\ crest_{mod,LP}(m)>crest_{mod,thr},\ t(m)>t_{thr}\\ \text{TRUE}, & \text{otherwise}\end{cases}$$

where $crest_{thr}$, $crest_{mod,thr}$ and $t_{thr}$ are decision thresholds.

16. The method of any of Embodiments 1-14, wherein determining which of two encodings mode to use based on at least the peakyness measure and the noise band detection measure comprises determining which of the two encoding modes to use based on when Harmonic_decision(m) is true wherein Harmonic_decision(m) is determined in accordance with $$\text{Harmonic\_decision}(m)=\begin{cases}\text{FALSE}, & crest_{LP}(m)>crest_{thr},\ crest_{mod,LP}(m)>crest_{mod,thr}\\ \text{TRUE}, & \text{otherwise}\end{cases}$$

where $crest_{thr}$ and $crest_{mod,thr}$ are decision thresholds.

17. The method of any of Embodiments 1-14, wherein determining the encoding mode based on at least the peakyness measure and the noise band detection measure comprises determining which of the two encoding modes to used when Harmonic_decision(m) is true wherein Harmonic_decision(m) is determined in accordance with $$\text{Harmonic\_decision}(m) = \begin{cases} \text{TRUE}, & crest_{LP}(m) > crest_{thr2},\ crest_{mod,LP}(m) < crest_{mod,thr2} \\ \text{FALSE}, & \text{otherwise} \end{cases}$$

wherein where $crest_{thr1}$ and $crest_{mod,thr2}$ are decision thresholds.

18. The method of any of Embodiments 15-17, wherein determining the encoding mode based on at least the peakyness measure and the noise band detection measure comprises determining the encoding mode based on at least the peakyness measure, the noise band detection measure, and Harmonic_decision(m).

19. The method of Embodiment 18, wherein determining the encoding mode based on at least the peakyness measure, the noise band detection measure, and the Harmonic_disabled(m) comprises:
responsive to the Harmonic_decision(m) being TRUE, determining (1101) to use a first one of the two encoding modes; and
responsive to the Harmonic_ddecision(m) being FALSE, determining (1103) to use a second one of the two encoding modes.

20. A method in an encoder to determine whether an input audio signal has high peakyness and low energy concentration, the method comprising:
deriving (1201) a frequency spectrum of an input audio signal;
obtaining (1203) a magnitude of a critical frequency region of the frequency spectrum;
obtaining (1205) a peakyness measure;
obtaining (1207) a noise band detection measure;
determining (1209) a harmonic condition based on at least the peakyness measure and the noise band detection measure; and
outputting (1211) an indication of whether the harmonic condition is true or false.

21. The method of Embodiment 20 further comprising:
determining that the harmonic condition is true responsive to a low pass filtered crest(m) being greater than a crest threshold and a low pass filtered $crest_{mod}(m)$ being greater than a $crest_{mod}$ threshold, wherein crest(m) is a measure of the peakyness of frame m and $crest_{mod}(m)$ is a measure of a local concentration of energy.

22. The method of Embodiment 21, further comprising:
determining crest(m) and $crest_{mod}(m)$ in accordance with $$crest(m) = \frac{\max(A_i(m))}{\sqrt{\frac{1}{M}\sum_{i=0}^{M-1} A_i(m)^2}}$$

$$crest_{mod}(m) = \frac{\max(movmean(A_i(m), W))}{\sqrt{\frac{1}{M}\sum_{i=0}^{M-1} A_i^2}}$$

where $A_i(m)$ is a magnitude of frequency spectrum of an audio signal at frame m, M is a number of frequency indices in a critical region, and movmean $(A_i(m), W)$ is a moving mean of $A_i(m)$ using a window size W.

23. The method of Embodiment 22, further comprising determining $A_i(m)$ in accordance with $$A_0(m) = |X(m, k_{start})|$$

$$A_1(m) = |X(m, k_{start} + 1)|$$

$$\vdots$$

$$A_{M-1}(m) = |X(m, k_{end})|$$

where X(m, k) denotes the frequency spectrum of frame m at frequency index k and $M = k_{end} - k_{start} + 1$ where $k_{end}$ and $k_{start}$ are frequency indices of the critical region of X(m, k).

24. The method of Embodiment 23, further comprising determining X(m, k) in accordance with $$X(m, k) = \sum_{n=0}^{L-1} x(m, n) e^{-i\frac{2\pi}{N}kn}$$

where L is a frame length of frame m.

25. An encoder apparatus (500) comprising:
processing circuitry (901); and
memory (905) coupled with the processing circuitry, wherein the memory includes instructions that when executed by the processing circuitry causes the communication device to perform operations according to any of Embodiments 1-24.

26. An encoder apparatus (500) adapted to perform according to any of Embodiments 1-24.

27. A computer program comprising program code to be executed by processing circuitry (901) of an encoder apparatus (500), whereby execution of the program code causes the encoder apparatus (500) to perform operations according to any of Embodiments 1-24.

28. A computer program product comprising a non-transitory storage medium including program code to be executed by processing circuitry (901) of an encoder apparatus (500), whereby execution of the program code causes the encoder apparatus (500) to perform operations according to any of Embodiments 1-24.

Explanations are provided below for various abbreviations/acronyms used in the present disclosure.

| Abbreviation | Explanation |
|---|---|
| MDCT | Modified Discrete Cosine Transform |
| DFT | Discrete Fourier Transform |

The invention claimed is:

1. A method in an encoder to determine which of two encoding modes or groups of encoding modes to use, the method comprising:
deriving a frequency spectrum of an input audio signal;
obtaining a magnitude of the frequency spectrum of a critical frequency region;
obtaining a peakyness measure;

obtaining a noise band detection measure, wherein obtaining the noise band detection measure comprises obtaining the noise band detection measure in accordance with $$\text{crest}_{mod}(m) = \frac{\max(movmean(A_i(m),\ W))}{\sqrt{\frac{1}{M}\sum_{i=0}^{M-1} A_i^2}}$$

where $\text{crest}_{mod}(m)$ is the noise band detection measure, $\text{movmean}(A_i(m),W)$ is a moving mean of the absolute spectrum $A_i(m)$ using a window size of W;

determining which one of the two encoding modes or groups of encoding modes to use based on at least the peakyness measure and the noise band detection measure, wherein determining which one of the two encoding modes or groups of encoding modes to use comprises determining whether to enable a harmonic music encoding mode based on the peakyness measure and the noise band detection measure; and encoding the input audio signal based on the encoding mode determined to use.

2. The method of claim 1, wherein encoding the input audio signal based on the encoding mode determined to use comprises:

responsive to a group of encoding modes being determined to use, selecting one encoding mode of the group of encoding modes to use to encode the input audio signal.

3. The method of claim 1, wherein deriving the frequency spectrum comprises deriving a frequency spectrum X(m, k), where X(m, k) denotes the frequency spectrum for frame m at frequency index k.

4. The method of claim 3, wherein obtaining the magnitude of the frequency spectrum of the critical frequency region comprises obtaining the magnitude of the frequency spectrum of the critical frequency region in accordance with $$A_0(m) = |X(m,\ k_{start})|$$
$$A_1(m) = |X(m,\ k_{start} + 1)|$$
$$\vdots$$
$$A_{M-1}(m) = |X(m,\ k_{end})|$$

where $M=k_{end}-k_{start}+1$ is the number of frequency indices in a critical band associated with the critical frequency region.

5. The method of claim 4, wherein obtaining the peakyness measure comprises obtaining the peakyness measure in accordance with $$\text{crest}(m) = \frac{\max(A_i(m))}{\sqrt{\frac{1}{M}\sum_{i=0}^{M-1} A_i(m)^2}}$$

where crest(m) gives a measure of the peakyness of frame m.

6. The method of claim 5, further comprising low pass filtering crest(m) and $\text{crest}_{mod}(m)$ according to $$\text{crest}_{LP}(m) = (1-\alpha)\cdot\text{crest}(m) + \alpha\cdot\text{crest}_{LP}(m-1)$$
$$\text{crest}_{mod,LP}(m) = (1-\beta)\cdot\text{crest}_{mod}(m) + \beta\cdot\text{crest}_{mod,LP}(m-1)$$

where α and β are filter coefficients.

7. The method of claim 6, wherein α is in the range of [0.5, 1) and β is in the range of [0.5, 1).

8. The method of claim 6, wherein determining which of two encoding modes or groups of encoding modes to use based on at least the peakyness measure and the noise band detection measure comprises determining the one of the two encoding modes or group of encoding modes when Harmonic_decision(m) is true wherein Harmonic_decision(m) is determined in accordance with $$\text{Harmonic\_decision}(m) = \begin{cases} \text{FALSE}, & \text{crest}_{LP}(m) > \text{crest}_{thr},\ \text{crest}_{mod,LP}(m) > \text{crest}_{mod,thr},\ t(m) > t_{thr} \\ \text{TRUE}, & \text{otherwise} \end{cases}$$

where $\text{crest}_{thr}$, $\text{crest}_{mod,thr}$ and $t_{thr}$ are decision thresholds.

9. The method of claim 8, wherein determining the encoding mode based on at least the peakyness measure and the noise band detection measure comprises determining the encoding mode based on at least the Harmonic_decision(m).

10. The method of claim 9, wherein determining the encoding mode based on the Harmonic_decision(m) comprises:

responsive to the Harmonic_decision(m) being TRUE, determining to use a first one of the two encoding modes; and responsive to the Harmonic_disabled (m) being FALSE, determining to use a second one of the two encoding modes.

11. The method of claim 6, wherein determining which of two encoding modes or groups of encoding modes to use based on at least the peakyness measure and the noise band detection measure comprises determining the one of the two encoding modes or group of encoding modes when Harmonic_decision(m) is true wherein Harmonic_decision(m) is determined in accordance with $$\text{Harmonic\_decision}(m) = \begin{cases} \text{FALSE}, & \text{crest}_{LP}(m) > \text{crest}_{thr},\ \text{crest}_{mod,LP}(m) > \text{crest}_{mod,thr} \\ \text{TRUE}, & \text{otherwise} \end{cases}$$

where $\text{crest}_{thr}$ and $\text{crest}_{mod,thr}$ are decision thresholds.

12. The method of claim 6, wherein determining the encoding mode based on at least the peakyness measure and the noise band detection measure comprises enabling the determining of the coding mode when Harmonic_decision (m) is true wherein Harmonic_decision(m) is determined in accordance with $$\text{Harmonic\_decision}(m) = \begin{cases} \text{TRUE}, & \text{crest}_{LP}(m) > \text{crest}_{thr2},\ \text{crest}_{mod,LP}(m) < \text{crest}_{mod,thr2} \\ \text{FALSE}, & \text{otherwise} \end{cases}$$

wherein where $\text{crest}_{thr2}$ and $\text{crest}_{mod,thr2}$ are decision thresholds.

13. The method of claim 4, wherein obtaining the peakyness measure comprises obtaining the peakyness measure in accordance with $$t(m) = \sum_{i=0}^{M-1} low(A_i(m))$$

$$\text{low}(A_i(m)) = \begin{cases} 1, & A_i(m) < A_{thr}\max(A_i(m)) \\ 0, & A_i(m) \geq A_{thr}\max(A_i(m)) \end{cases}$$

where $A_{thr}$ is a relative threshold.

14. The method of claim 13, wherein $A_{thr}$=0.1.

15. The method of claim 13, wherein $A_{thr}$ is in a range [0.01, 0.4].

16. The method of claim 1, wherein deriving the frequency spectrum comprises:

segmenting the input audio signal x(m, n), n=0, 1, 2, . . . L−1 into audio frames of length L where m denotes a frame index and n denotes a sample index within the frame;

transforming the input audio signal in a frequency domain representation in accordance with $$X(m, k) = \sum_{k=0}^{2L-1} x(m, n)w_a(n)\cos\left(n + \frac{1}{2} + \frac{L}{2}\right)\left(k + \frac{1}{2}\right)$$

where X(m, k) denotes a modified discrete cosine transform, MDCT, frequency spectrum of frame m at frequency index k and $w_a(n)$ is an analysis window;

obtaining the magnitude spectrum of X(m, k) defined by frequency indices $k=k_{start} \ldots k_{end}$ where the critical frequency region is an upper half of X(m, k).

17. The method of claim 16, wherein the critical frequency region corresponds to $k_{start}$=320 and $k_{end}$=639 where the input sampling rate is 32 kHz and the frame length is L=640.

18. The method of claim 1 wherein movmean($A_i$(m), W) is determined in accordance with $$movmean(A_i(m), W) = \frac{1}{b-a+1}\sum_{i=a}^{b} A_i(m)$$

$$a = \max(0, i - (W-1)/2)$$

$$b = \min(M-1, i + (W-1)/2).$$

19. An encoder apparatus comprising:

processing circuitry; and memory coupled with the processing circuitry, wherein the memory includes instructions that when executed by the processing circuitry causes the encoder apparatus to perform operations according to claim 1.

20. An encoder apparatus adapted to perform the method according to claim 1.

21. A method in an encoder to determine whether an input audio signal has high peakyness and low energy concentration, the method comprising:

deriving a frequency spectrum of an input audio signal;

obtaining a magnitude of a critical frequency region of the frequency spectrum;

obtaining a peakyness measure of a frame of the input audio signal;

obtaining a noise band detection measure, wherein obtaining the noise band detection measure comprises obtaining the noise band detection measure in accordance with $$\text{crest}_{mod}(m) = \frac{\max(movmean(A_i(m), W))}{\sqrt{\frac{1}{M}\sum_{i=0}^{M-1} A_i^2}}$$

where $\text{crest}_{mod}$(m) is the noise band detection measure, movmean ($A_i$(m), W) is a moving mean of the absolute spectrum $A_i$(m) using a window size of W;

determining a harmonic condition based on at least the peakyness measure and the noise band detection measure, wherein determining which one of the two encoding modes or groups of encoding modes to use comprises determining whether to enable a harmonic music encoding mode based on the peakyness measure and the noise band detection measure; and transmitting an indication of whether the harmonic condition is true or false.

22. The method of claim 21 further comprising:

determining that the harmonic condition is true responsive to a low pass filtered crest(m) being greater than a crest threshold and a low pass filtered $\text{crest}_{mod}$(m) being greater than a $\text{crest}_{mod}$ threshold, wherein crest(m) is a measure of the peakyness of frame m and $\text{crest}_{mod}$(m) is a measure of a local concentration of energy.

23. The method of claim 22, further comprising:

determining crest(m) in accordance with $$\text{crest}(m) = \frac{\max(A_i(m))}{\sqrt{\frac{1}{M}\sum_{i=0}^{M-1} A_i(m)^2}}$$

where $A_i$(m) is a magnitude of a frequency spectrum of an audio signal at frame m, and M is a number of frequency indices in a critical region.

24. The method of claim 23, further comprising determining $A_i$(m) in accordance with $$A_0(m) = |X(m, k_{start})|$$

$$A_1(m) = |X(m, k_{start} + 1)|$$

$$\vdots$$

$$A_{M-1}(m) = |X(m, k_{end})|$$

where X(m, k) denotes the frequency spectrum of frame m at frequency index k and $M=k_{end}-k_{start}+1$ where $k_{end}$ and $k_{start}$ are frequency indices of the critical region of X(m, k).

25. The method of claim 24, further comprising determining X(m, k) in accordance with $$X(m, k) = \sum_{n=0}^{L-1} x(m, n)e^{-i\frac{2\pi}{N}kn}$$

where L is a frame length of frame m.

* * * * *